United States Patent
Rollinger et al.

(10) Patent No.: US 10,844,733 B2
(45) Date of Patent: Nov. 24, 2020

(54) TURBINE BLADE COMPRISING A COOLING CIRCUIT

(71) Applicant: SAFRAN, Paris (FR)

(72) Inventors: Adrien Bernard Vincent Rollinger, Moissy-Cramayel (FR); Romain Pierre Cariou, Moissy-Cramayel (FR); Thomas Michel Flamme, Moissy-Cramayel (FR); Sylvain Paquin, Moissy-Cramayel (FR)

(73) Assignee: SAFRAN, Paris (FR)

(*) Notice: Subject to any disclaimer, the term of this patent is extended or adjusted under 35 U.S.C. 154(b) by 0 days.

(21) Appl. No.: 16/336,259

(22) PCT Filed: Sep. 28, 2017

(86) PCT No.: PCT/FR2017/052636
§ 371 (c)(1),
(2) Date: Mar. 25, 2019

(87) PCT Pub. No.: WO2018/060627
PCT Pub. Date: Apr. 5, 2018

(65) Prior Publication Data
US 2019/0211693 A1    Jul. 11, 2019

(30) Foreign Application Priority Data
Sep. 29, 2016 (FR) ...................... 16 01421

(51) Int. Cl.
*F01D 5/18* (2006.01)
(52) U.S. Cl.
CPC ............. *F01D 5/187* (2013.01); *F01D 5/185* (2013.01); *F01D 5/188* (2013.01); *F01D 5/189* (2013.01);
(Continued)

(58) Field of Classification Search
CPC ........... F01D 5/187; F01D 5/188; F01D 5/189
See application file for complete search history.

(56) References Cited

U.S. PATENT DOCUMENTS 5,931,638 A * 8/1999 Krause .................... F01D 5/186
                                                          415/115
10,040,115 B2 * 8/2018 Slavens ................... B22C 9/106
(Continued)

FOREIGN PATENT DOCUMENTS

| EP | 2 899 370 A1 | 7/2015 |
| WO | 2015/171145 A1 | 11/2015 |
| WO | 2015/181488 A1 | 12/2015 |

OTHER PUBLICATIONS

International Search Report dated Jan. 30, 2018, in International Application No. PCT/FR2017/052636 (3 pages).

*Primary Examiner* — Justin D Seabe
*Assistant Examiner* — Behnoush Haghighian
(74) *Attorney, Agent, or Firm* — Bookoff McAndrews, PLLC (57) ABSTRACT

An aviation turbine blade extending in the radial direction and presenting a pressure side and a suction side, including a plurality of pressure side cavities extending radially at the pressure side of the blade, a plurality of suction side cavities extending radially at the suction side of the blade, and at least one central cavity located in the central portion of the blade and surrounded by pressure side cavities and by suction side cavities, the blade further including a plurality of cooling circuits, in which at least a first cooling circuit comprises: a first cavity and a second cavity, the first and second cavities communicating with each other at a radially inner end and at a radially outer end of the blade.

7 Claims, 5 Drawing Sheets

(52) U.S. Cl.
CPC .... *F05D 2220/323* (2013.01); *F05D 2240/24* (2013.01); *F05D 2250/185* (2013.01); *F05D 2260/202* (2013.01); *F05D 2260/205* (2013.01); *F05D 2260/221* (2013.01); *Y02T 50/60* (2013.01)

(56) References Cited

U.S. PATENT DOCUMENTS

| | | | |
|---|---|---|---|
| 2008/0028606 A1* | 2/2008 | Krishnakumar | F01D 5/187 29/889.2 |
| 2008/0080979 A1* | 4/2008 | Brassfield | F01D 5/18 416/97 R |
| 2008/0181784 A1* | 7/2008 | Fokine | F01D 5/187 416/97 R |
| 2009/0175733 A1* | 7/2009 | Poon | B22C 9/10 416/97 R |
| 2014/0199177 A1* | 7/2014 | Propheter-Hinckley | B22C 9/103 416/97 R |
| 2015/0198049 A1* | 7/2015 | Jung | F01D 5/187 416/1 |
| 2017/0183969 A1* | 6/2017 | Dujol | B22C 9/103 |
| 2017/0191368 A1* | 7/2017 | Dujol | F01D 9/041 |

* cited by examiner

TURBINE BLADE COMPRISING A COOLING CIRCUIT

CROSS-REFERENCE TO RELATED APPLICATIONS

This application is the U.S. national phase entry under 35 U.S.C. § 371 of International Application No. PCT/FR2017/052636, filed on Sep. 28, 2017, which claims priority to French Patent Application No. 1601421, filed on Sep. 29, 2016.

FIELD OF THE INVENTION

The present invention relates to the field of high-pressure gas turbine blades for use in aviation, more particularly to the cooling circuits of those blades, and to a gas turbine including such blades.

PRIOR ART

The rotor blades of an aeroengine gas turbine, and in particular of its high-pressure turbine, are subjected to the very high temperatures of combustion gas while the engine is in operation. Those temperatures reach values that are well above the temperatures that the various parts in contact with the gas can withstand without damage, which results in their lifetimes being limited.

In addition, raising the temperature of the gas in the high-pressure turbine makes it possible to improve the efficiency of an engine, and therefore the ratio of the thrust of the engine divided by the weight of an airplane powered by that engine. Consequently, efforts are made to produce turbine blades that can withstand increasingly high temperatures, and to optimize the cooling of those blades.

It is thus known to provide those blades with cooling circuits aiming to reduce the temperature of the blades. By means of such circuits, cooling (or "cold") air, which is generally introduced into the blade via its root, passes through the blade following a stream formed by cavities made in the thickness of the blade before being ejected through orifices opening out in the surface of the blade.

Such cooling circuits are said to be "advanced" when they are made up of a plurality of independent cavities in the thickness of the blade, or when some of those cavities are dedicated to localized cooling. Those cavities make it possible to define a blade that is compatible with the requirements for engine performance and part lifetimes.

However, the cooling circuits take "cold" air from the primary stream through the engine, in such a manner that the temperature of the cold air, acting as a heat transfer fluid, is lower than the temperature of the air flowing over the surface of the blade, and referred to as "hot" air. That air taken from the primary stream through the engine thus constitutes a loss and degrades efficiency and overall performance of the engine.

In addition, advanced circuits present the drawback of giving rise to a considerable difference in temperature between the outer walls of the blade in contact with the stream and the walls in the core of the blade. Those considerable temperature differences lead to stresses that can jeopardize the mechanical strength of the blade in operation, and can thus reduce its lifetime.

There therefore exists a need for a cooling circuit for cooling an aviation gas turbine blade, that makes it possible to reduce temperature gradients so as to limit internal mechanical stresses, and to optimize cooling of the blade by reducing the flow rate of the air used to cool it, and as a result improving overall efficiency of the turbine.

SUMMARY OF THE INVENTION

The present disclosure provides an aviation turbine blade extending in the radial direction and presenting a pressure side and a suction side, including a plurality of pressure side cavities extending radially at the pressure side of the blade, a plurality of suction side cavities extending radially at the suction side of the blade, and at least one central cavity located in the central portion of the blade and surrounded by pressure side cavities and by suction side cavities, the blade further including a plurality of cooling circuits, in which at least a first cooling circuit comprises:

a first cavity and a second cavity, the first and second cavities communicating with each other at a radially inner end and at a radially outer end of the blade;

a third cavity communicating with the second cavity at the radially outer end; and a fourth cavity communicating with the third cavity at the radially inner end;

the first and second cavities being configured to be fed jointly with cold air through a common air intake opening at the radially inner end, and so that the air flows radially therein in a same direction;

the first cavity being a pressure side cavity, the second cavity being a central cavity, and the third and fourth cavities being suction side cavities.

In the present disclosure, the term "radially" refers to the direction extending from the blade root, i.e. the root of the blade, towards the blade tip, i.e. the end that is radially opposite the root of the blade. Thus, in the present disclosure, the radially inner end designates the blade root, and the radially outer end designates the blade tip.

In addition, in the present disclosure, the term "upwards" refers to air flowing in a cavity from the blade root towards the blade tip, and "downwards" refers to air flowing in a cavity from the blade tip towards the blade root.

Each cavity is defined by a wall. The pressure side cavities extend radially, i.e. from the blade root towards the blade tip, on the pressure side of the blade. In other words, a face of at least one portion of the wall defining each pressure side cavity is in contact with the air outside the blade on the pressure side. None of the faces of the walls defining each pressure side cavity is in contact with the air outside the blade on the suction side.

The suction side cavities extend radially, i.e. from the blade root towards the blade tip, on the suction side of the blade. In other words, a face of at least one portion of the wall defining each suction side cavity is in contact with the air outside the blade on the suction side. None of the faces of the walls defining each suction side cavity is in contact with the air outside the blade on the pressure side.

The central cavity also extends radially, i.e. from the blade root towards the blade tip, in the central portion of the blade. It should be understood that the term "central portion of the blade" means that none of the faces of the wall defining the central cavity is in contact with the air outside the blade. In other words, the wall defining the central cavity is in contact either with one or more pressure side cavity(ies) and with one or more suction side cavity(ies), with the exception of the walls separating said pressure side and suction side cavities.

A cooling "circuit" designates a plurality of cavities communicating with one another. In the present disclosure, at least one cooling circuit has first, second, third, and fourth cavities.

The first and second cavities communicate with each other at the root of the blade so as to form a first common chamber, and they are fed simultaneously with cold air from the first common chamber. The first and second cavities are then isolated from each other by a wall extending in the radial direction, and they communicate with each other once again at the blade tip so as to form a second common chamber.

Thus, when cold air is fed into the first common chamber, the cold air is divided between the first cavity and the second cavity by flowing upwards in each of the two cavities.

The first cavity is a pressure side cavity. Consequently, when the cold air flows in the first cavity, it exchanges heat by forced convection with the wall separating the first cavity from the hot air on the pressure side. Thus, the air flowing upwards in the first cavity absorbs heat from the wall, with its temperature rising on getting closer to the blade tip.

The second cavity is a central cavity. Consequently, the cold air flowing in the cavity does not exchange heat with the hot air outside the blade. Thus, the temperature of the air flowing upwards in the second cavity, in parallel with the air flowing in the first cavity, rises very little on getting closer to the blade tip. Cold air may therefore reach the second common chamber, where it mixes with the air coming from the first cavity.

The third cavity communicates with the second cavity at the blade tip, and with the fourth cavity at the blade tip. The air coming from the first and second cavities thus flows downwards in the third cavity, and then upwards in the fourth cavity.

Consequently, the third and fourth cavities, being suction side cavities, may be fed with cold air coming from the second cavity, thus improving suction side cooling.

This configuration also presents the advantage of targeting cooling on the desired areas. Indeed, the air moving within the cavities is subjected to the Coriolis force associated with the fast rotation of the blade. That makes it possible to press the cold air as hard as possible against the outer walls, i.e. the walls defining the pressure side and the suction side of the blade, constituting the hottest areas. Heat exchange is thus optimized for the outer walls, further making it possible to improve the uniformity of temperatures in the core of the blade, to minimize the temperature gradients in the core of the blade, and therefore to limit internal stresses in the walls forming the cavities, thus improving the mechanical strength of the blade. Furthermore, the second cavity, acting as a mechanically flexible core, makes it possible to absorb the mechanical stress generated by the thermal expansion of the outer walls in contact with hot air.

In certain embodiments, the blade includes a plurality of pressure side orifices, each communicating with the first cavity and opening out in the pressure side of the blade.

These pressure side orifices may be holes made in the wall separating the first cavity from the pressure side of the blade and distributed in the radial direction over at least a portion of the first cavity, enabling a certain volume of cold air flowing upwards in the first cavity to be discharged on the pressure side of the blade.

The discharged air makes it possible to further cool the outer face of the pressure side wall, by generating a cooling film on the pressure side of the blade. Furthermore, the temperature of the air flowing in the first cavity rises little by little going upwards, as described above. These pressure side orifices make it possible for a large amount of the heated air to be discharged outside the first cavity. Consequently, the air feeding the third cavity, which comes from the first and second cavities, is constituted mostly by cold air coming from the second cavity. This makes it possible to improve cooling of the suction side cavities, i.e. the third and the fourth cavities.

In certain embodiments, the blade includes a plurality of suction side orifices, each communicating with the fourth cavity and opening out onto the suction side of the blade.

These suction side orifices may be holes made in the wall separating the fourth cavity from the suction side of the blade and distributed in the radial direction over at least a portion of the fourth cavity, enabling a certain volume of air flowing upwards in the fourth cavity to be discharged on the suction side of the blade.

The discharged air makes it possible to further cool the outer face of the suction side wall, by generating a cooling film on the suction side of the blade. Furthermore, these suction side orifices make it possible to entrain the air along the cooling circuit. Since the suction side pressure is much lower than the feed pressure of the cooling circuits, the presence of these orifices makes it possible for a flow of air in the cooling circuit to be created naturally.

In certain embodiments, the blade includes at least a second cooling circuit including two pressure side cavities communicating with each other via a plurality of passages distributed in the radial direction along the blade between the two cavities, one of the two cavities being fed with cold air via an air intake opening out at the radially inner end of the blade.

The cavity that is fed with cold air may also communicate with the pressure side face of the blade via orifices that are distributed radially over at least a portion of said cavity. Thus, when cold air flows in the cavity, it exchanges heat by forced convection with the wall separating the cavity from the hot air on the pressure side, and it is also discharged through the orifices, generating a cooling film on the pressure side of the blade, while also penetrating into the other cavity via the plurality of passages.

In certain embodiments, the blade includes at least a third cooling circuit including a suction side cavity and a trailing edge cavity extending radially both on the suction side and on the pressure side of the blade at the trailing edge, the two cavities being fed with cold air via an air intake opening at the radially inner end of the blade, the suction side cavity forming an angle at the radially outer end of the blade, in such a manner as to extend until it reaches the trailing edge of the blade.

In certain embodiments, the cavities of the third cooling circuit communicate with a plurality of trailing edge orifices opening out in the pressure side face of the blade.

In certain embodiments, the plurality of cooling circuits are independent from one another.

It should be understood that the term "independent from one another" means that none of the cavities making up a given cooling circuit communicates with a cavity of another cooling circuit. For each cooling circuit, that makes it possible to produce cooling that is targeted onto precise areas of the blade, without the circuits interfering with one another.

In certain embodiments, the blade includes fewer than two thin cavities, where a thin cavity has a first length that is greater than or equal to at least seven times a second length in section perpendicular to the radial direction.

In certain embodiments, the thickness of each thin cavity is less than or equal to 1.2 millimeters (mm), thickness being the distance between the sides of the thin cavity along the first length in a section perpendicular to the radial direction.

In certain embodiments, each thin cavity extends radially over at least half of the blade.

In certain embodiments, the blade includes at most one thin cavity.

The presence of a limited number of thin cavities facilitates the process of manufacturing the blades. The ceramic cores necessary for preparing the cooling circuits are very fragile because of their shape associated with the small thickness of the thin cavities. Reducing the number of these thin cavities makes it possible to mitigate these drawbacks.

The present disclosure also provides a gas turbine including blades of the present disclosure.

BRIEF DESCRIPTION OF THE DRAWINGS

The invention and its advantages can be better understood on reading the following detailed description of various embodiments of the invention given as non-limiting examples. The description refers to the accompanying sheets of drawings, in which.

DETAILED DESCRIPTION OF EMBODIMENTS

Figure 2:
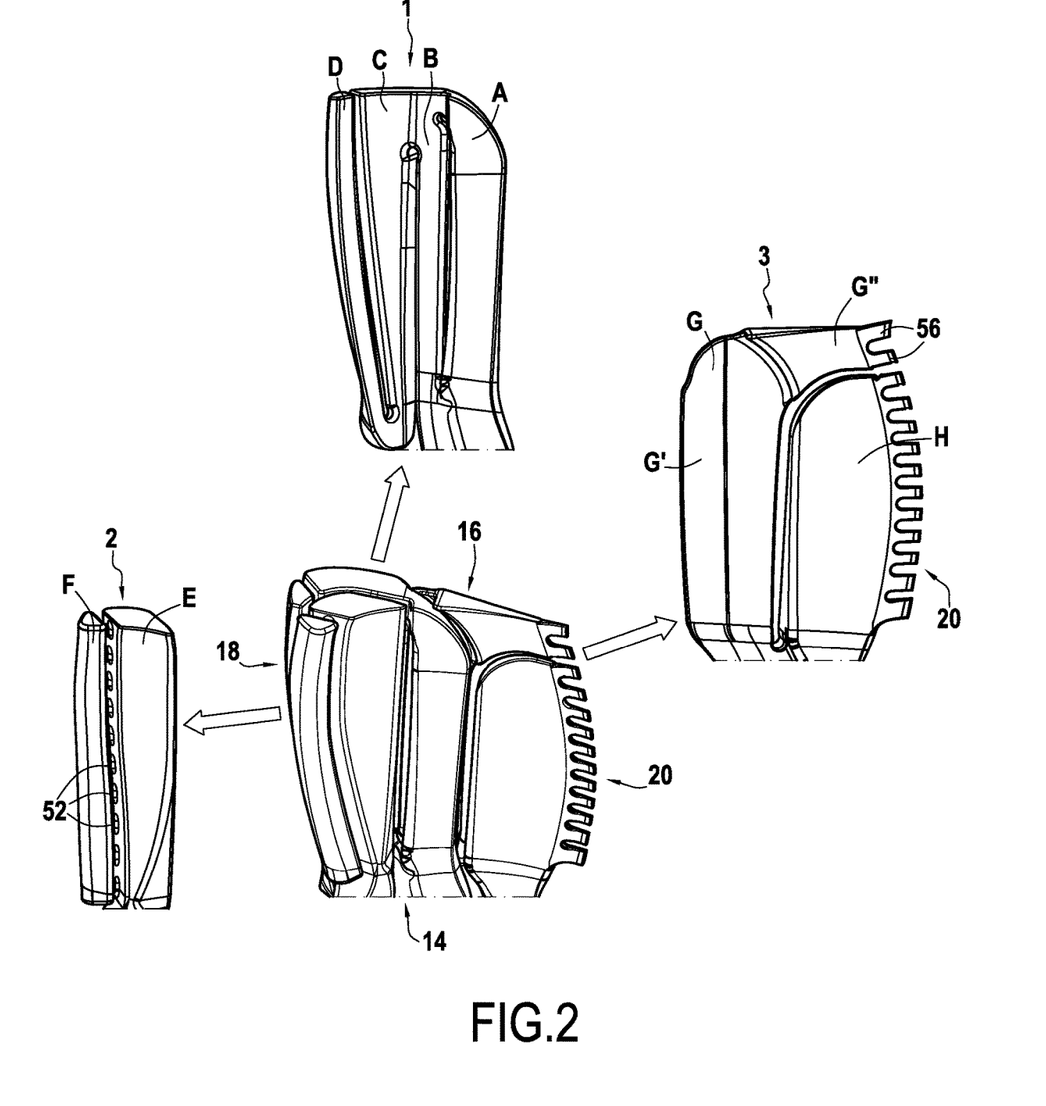
FIG. 2 is a perspective view representing symbolically the cavities of the various cooling circuits of the blade.
Figure 3:
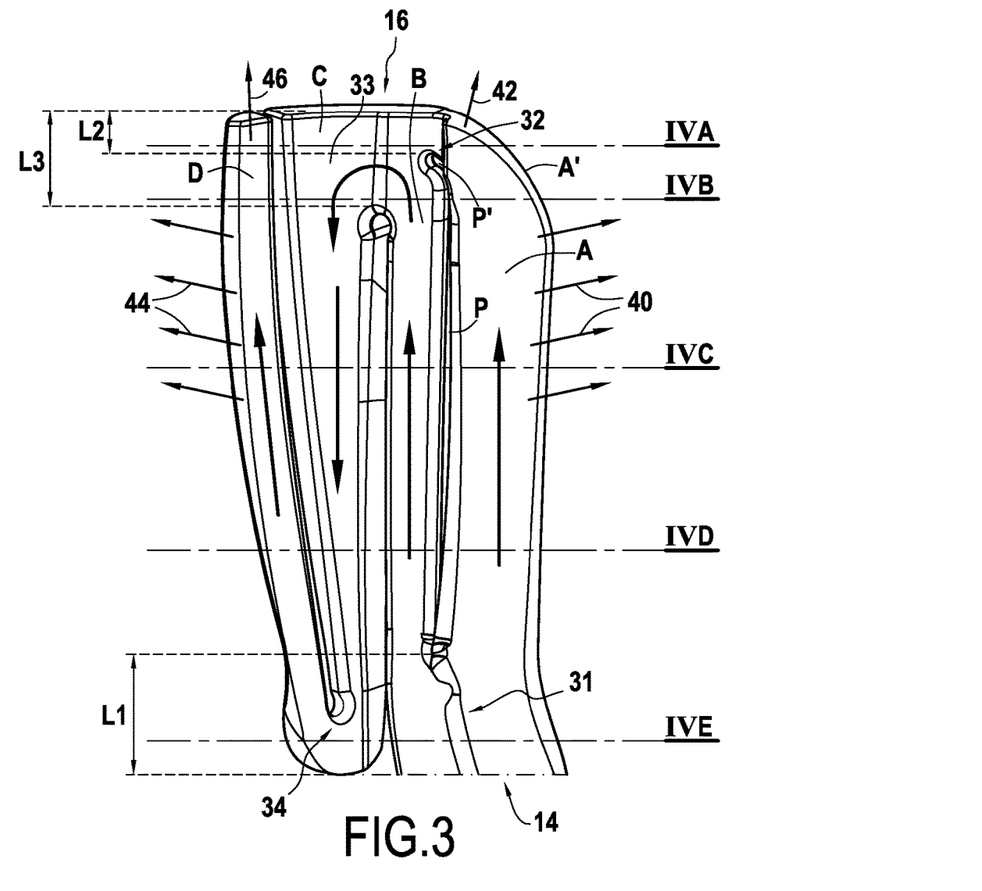
FIG. 3 is a perspective view representing symbolically the cavities of the first cooling circuit of the blade.

The invention is described below with reference to FIGS. 1 to 5. It should be observed that FIGS. 2 and 3 do not show portions of the blade as such, but show the cavities within the blade. In other words, the lines shown in FIGS. 2 and 3 represent the internal walls of the blade defining these cavities.

Figure 1:
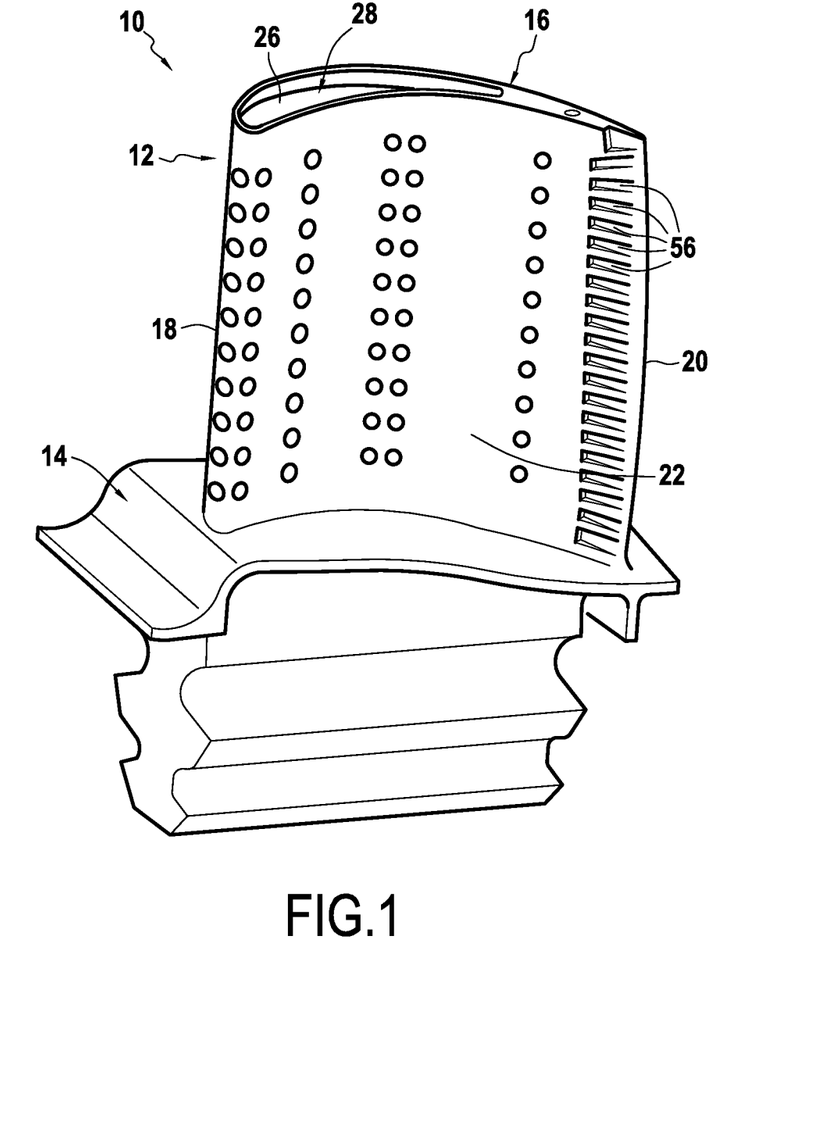
FIG. 1 is a perspective view of a turbine blade of the present invention.

FIG. 1 shows a rotor blade 10, e.g. made of metal, for a high-pressure turbine of a turbine engine. Naturally, the present invention may also apply to other blades or vanes of a turbine engine.

The blade 10 has an aerodynamic surface 12 (or airfoil that extends radially between a blade root 14 and a blade tip 16.

The blade root 14 is adapted to be mounted on a disk of the rotor of the high-pressure turbine, the blade tip 16 being radially opposite from the blade root 14.

The aerodynamic surface 12 presents four distinct zones: a leading edge 18 placed facing the flow of hot gas coming from the combustion chamber of the turbine engine; a trailing edge 20 opposite from the leading edge 18; a pressure side face 22; and a suction side face 24; the pressure and suction side faces 22, 24 connecting the leading edge 18 to the trailing edge 20.

At the blade tip 16, the aerodynamic surface 12 of the blade is closed by a transverse wall 26. In addition, the aerodynamic surface 12 extends radially slightly beyond the transverse wall 26 in such a manner as to form a recess 28, hereafter referred to as a bathtub of the blade. This bathtub 28 therefore has a base formed by the transverse wall 26, an edge formed by the aerodynamic surface 12, and is open towards the blade tip 16.

In the example described, the blade 10 includes three mutually independent cooling circuits designed for cooling the blade: a first cooling circuit 1, a second cooling circuit 2, and a third cooling circuit 3.

The first cooling circuit 1 includes a first cavity A, a second cavity B, a third cavity C, and a fourth cavity D. The first cavity A is a pressure side cavity, the second cavity B is a central cavity, the third and fourth cavities C and D are suction side cavities.

The first cooling circuit is fed with cold air by the cavities A and B at the blade root 14. The cold air is air acting as a heat transfer fluid that is taken from other circuits of the engine and that is colder than the air flowing over the pressure and suction side faces 22, 24. The first and second cavities A et B communicate with each other at the blade root 14, in the bottom 40% of the blade, preferably in the bottom 25%, more preferably in the bottom 10% in the radial direction, so as to form a first common chamber 31 (FIGS. 3 and 4E) extending radially at the blade root 14 over a length L1. The length L1 may represent not more than 40% of the total length of the blade. The first and second cavities A et B also communicate with each other at the blade tip 16, in the top 20% of the blade, preferably in the top 15%, more preferably in the top 10% in the radial direction, so as to form a second common chamber 32 (FIGS. 3 and 4A) extending radially over a length L2. The length L2 may represent not more than 20% of the total length of the blade. Between the common chambers 31 and 32, the cavities A and B are isolated from each other by a wall P extending radially along the blade 10. Consequently, the air coming from the first common chamber 31 then flows upwards in the cavities A and B (arrows in FIG. 3) separately and in parallel, until it reaches the second common chamber 32.

In addition, the first cavity A communicates with the pressure side face 22 of the blade 10 via a plurality of pressure side orifices 40, distributed radially along the blade 10. Thus, a portion of the air flowing in the first cavity A is discharged through the orifices 40, in such a manner as to create a cooling film on the pressure side face 22, as well as through a blade tip orifice 42 located on the blade tip, in such a manner as to create a cooling film on the wall 26 of the bathtub 28. The air flowing in the first cavity A, which air is not discharged through the orifices 40 or 42 mixes with the air coming from the second cavity B, in the second common chamber 32.

In addition, the cavity A may be defined, in its top portion, by a curved wall A' extending over 20%, preferably 15%, more preferably 10% of the length of the blade in the radial direction, the curve of the wall A' being directed towards the leading edge 18. This curved shape of the wall makes it possible to guide the air flowing in the cavity A towards the following cavities, and to ensure that air is distributed uniformly in the cavities while limiting head losses. Furthermore, the wall P separating the cavities A and B may comprise, in its top portion, a curved portion P', forming an angle relative to the rest of the wall P, in such a manner that this curved portion P' is directed towards the leading edge 18. This curved portion P' makes it possible to guide the air flowing in the cavity B towards the cavity C. The curved wall A' and the curved portion P' make it possible to facilitate causing the air coming from the cavities A and B to turn about into the cavity C, i.e. facilitating the change of airflow direction, passing from moving upwards in the cavities A and B to moving downwards in the cavity C. This also makes it possible to limit head losses during this about turn.

The second and third cavities B and C communicate with each other at the blade tip 16, in the top 20% of the blade, preferably in the top 15%, more preferably in the top 10% in the radial direction, so as to form a third common chamber 33 (FIGS. 3 and 4B) extending radially over a length L3. The second and third chambers 32 and 33 therefore communicate with each other at the blade tip 16 (FIGS. 3 and 4A), in such a manner that the first cavity A may also communicate with the third cavity C. The air flowing in the third cavity C therefore comes from the cavities A and B, and flows downwards.

Preferably, the length L3 may be greater than the length L2. Thus, the air flowing in the third cavity C comes mainly from the second cavity B. In addition, most of the air coming from the first cavity A has been discharged through the pressure side orifices 40 and the blade tip orifice 42. More precisely, at least 75%, preferably at least 80%, more preferably at least 85% of the air flowing in the third cavity C comes from the second cavity B. That presents the advantage of conserving cold air inside the third cavity C, in such a manner as to cool the suction side face 24 of the blade more effectively. Since the second cavity B is a central cavity, the air coming from it is colder than the air coming from the first cavity A, said first cavity being heated by heat transfer, in particular by forced convection, with the pressure side face 22.

Figure 4A:
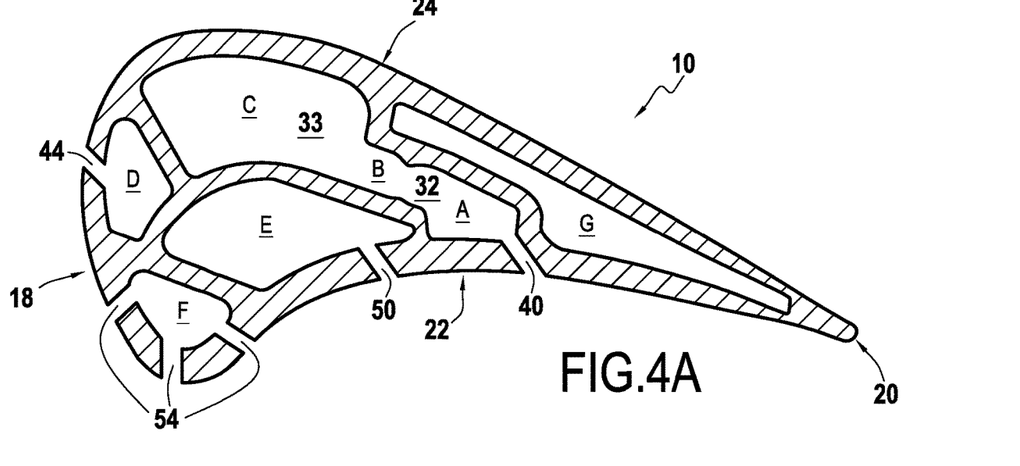
FIGS. 4A to 4E are cross sections as shown in FIG. 3 for various radial positions going from the blade root to the blade tip.
Figure 4B:
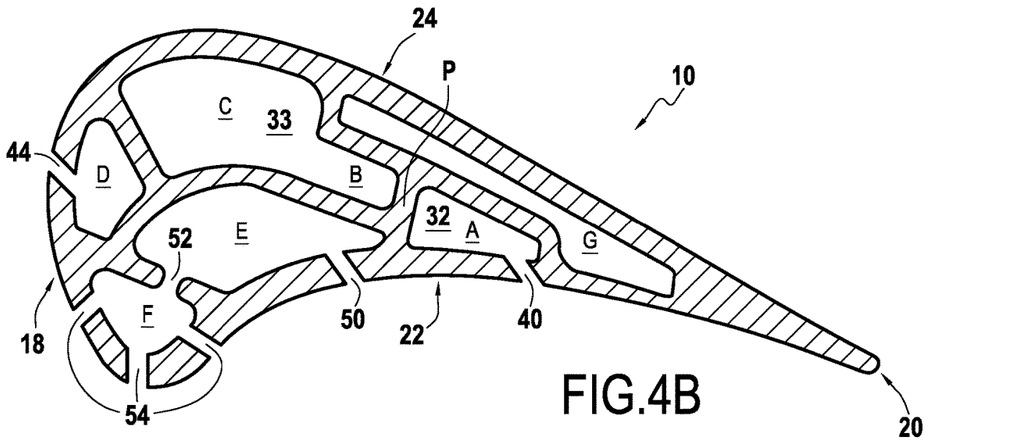
Figure 4C:
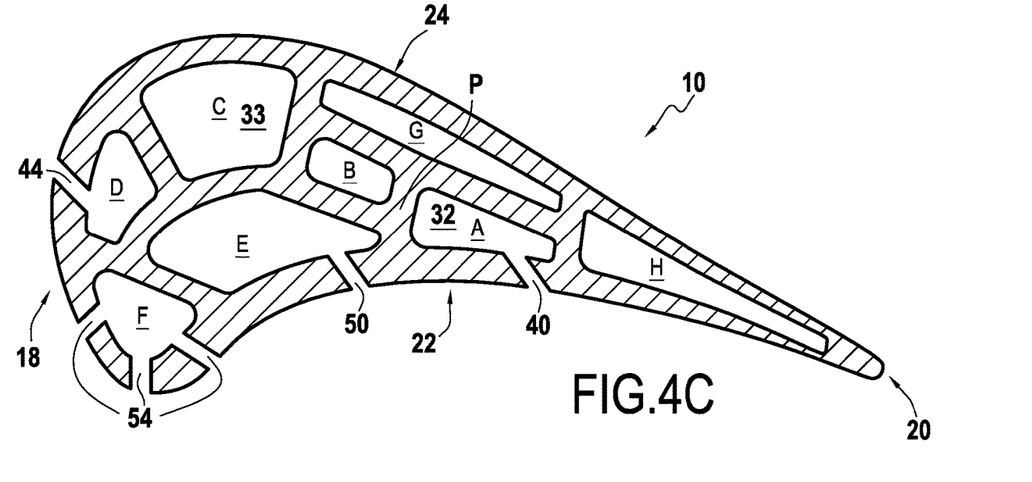
Figure 4D:
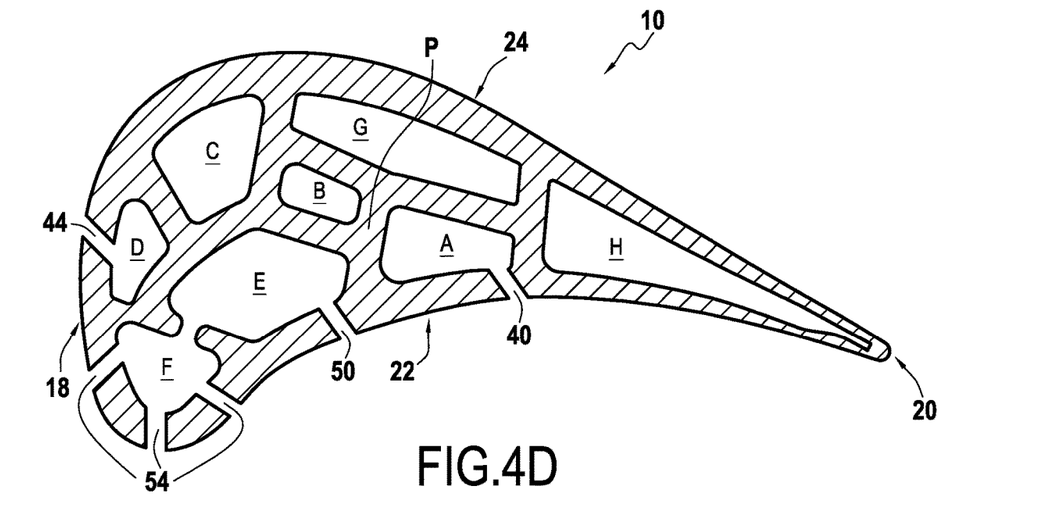
Figure 4E:
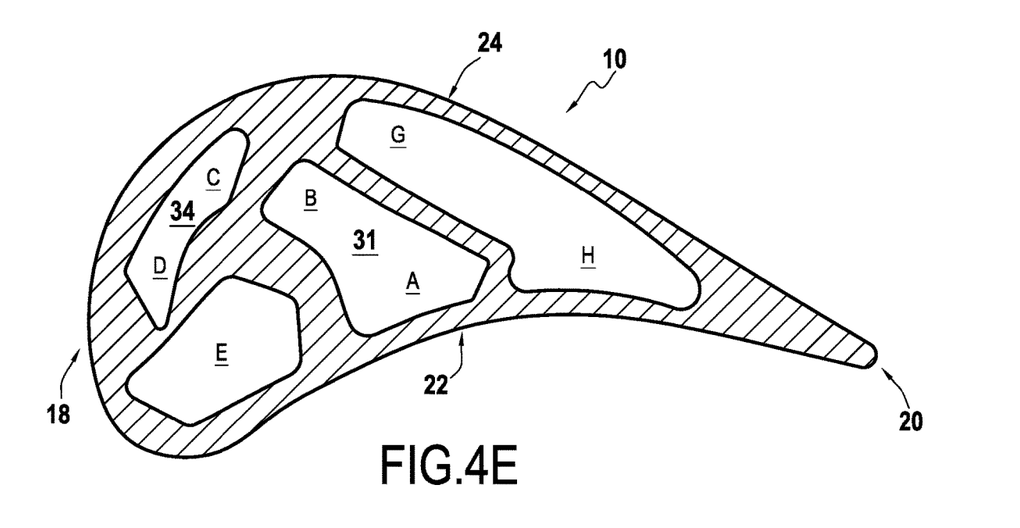

The third and fourth cavities C and D communicate with each other at the blade root 14, in the bottom 10% of the blade, preferably in the bottom 8%, more preferably in the bottom 6% in the radial direction, so as to form a fourth common chamber 34 (FIGS. 3 and 4E). The air flowing in the fourth cavity D therefore comes from the third cavity C, and flows upwards, i.e. from the blade root 14 to the blade tip 16. The fourth cavity D communicates with the suction side via a plurality of suction side orifices 44 distributed radially along the blade 10. Thus, a portion of the air flowing in the fourth cavity D is discharged through the orifices 44, in such a manner as to create a cooling film on the suction side face 24, as well as through a blade tip orifice 46 located on the blade tip 16, in such a manner as to create a cooling film on the wall 26 of the bathtub 28.

Figure 5:
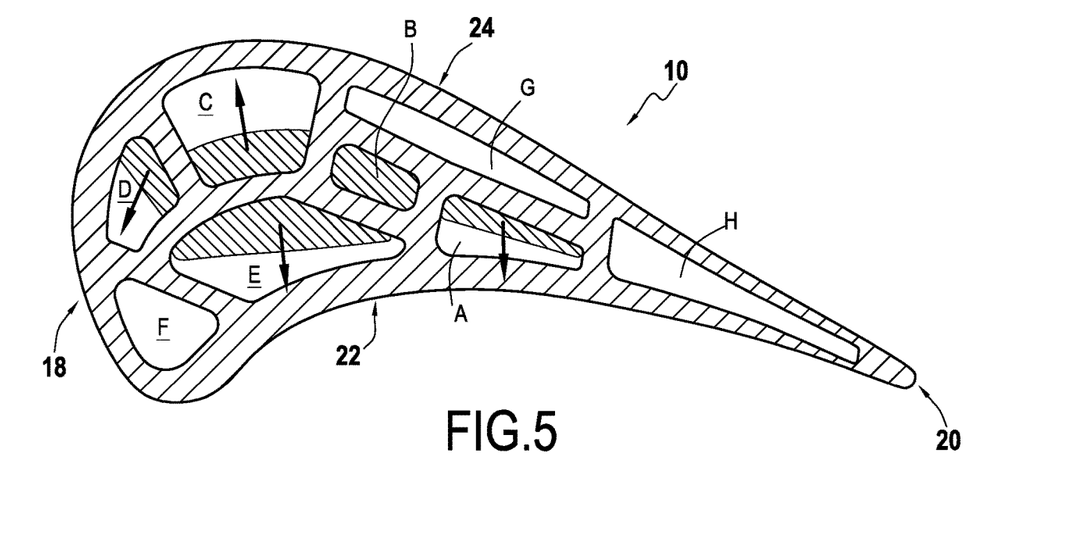
FIG. 5 is a cross section of the blade, showing the zones in which heat transfer is the greatest.

The first cooling circuit 1 thus extends from the pressure side face 22, on the side of the trailing edge 20, until it reaches the suction side face 24, on the side of the leading edge 18. This configuration makes it possible to take advantage of the various effects associated with the fast rotation of the blade 10, in particular Coriolis force, in order to press the air against places requiring heat transfer to be optimized, in particular the walls defining the pressure side or suction side faces of the inside of the blade. The hatched areas in FIG. 5 show the areas in which the air does the least work, i.e. in which less heat transfer takes place. However, the arrows in FIG. 5 show the orientation of the Coriolis force, in other words the areas in which the air is pressed and in which heat transfer is optimized. This configuration thus makes it possible to reduce the flow of cold air required for cooling the blade 10, by targeting heat transfer on the desired areas.

The central cavity B thus acts like a mechanically flexible core of the blade. The central cavity makes it possible to compensate for the mechanical deformation in the walls of the blade 10 adjacent to the pressure side and suction side faces 22, 24, which deformation is generated by thermal expansion due to high temperatures on the faces. This thus makes it possible to limit external excess stress on the blade 10.

The second cooling circuit 2, independent from the first cooling circuit 1, comprises two pressure side cavities E and F. The cavity E, adjacent to the cavities A, B, C, and D of the first cooling circuit, is fed with cold air at the blade root 14 (FIG. 4E). The cavity F is located on the side of the leading edge 18 of the blade 10. The cavities E and F communicate with each other by means of a plurality of passages 52 distributed in the radial direction along the blade 10 between these two cavities (FIGS. 4B and 4D).

The cavity E communicates with the pressure side face 22 of the blade 10 via orifices 50 that are distributed in the radial direction over at least a portion of the cavity E. Thus, when the cold air flows in the cavity, it exchanges heat by forced convection with the wall separating the cavity from the hot air on the pressure side, and it is also discharged through the orifices 50, generating a cooling film on the pressure side of the blade, while also penetrating into the other cavity via the plurality of passages 52. The air flowing in the cavity F is discharged through orifices 54 distributed in the radial direction over at least a portion of the cavity F.

The third cooling circuit 3, independent from the first and second cooling circuits 1 and 2, includes a suction side cavity G adjacent to the cavities A, B, and C, and a trailing edge cavity H extending radially both on the suction side 24 and on the pressure side 22 of the blade on the trailing edge side 20. The cavities G and H are both fed with cold air by an air intake opening out at the blade root 14.

The suction side cavity G extends firstly radially in a first cavity portion G', from the blade root 14 until it reaches the blade tip 16 along the suction side face 24, and it extends secondly in a direction that is substantially perpendicular to the radial direction in a second cavity portion G", along the bathtub 28, by forming an angle in the trailing edge direction 20 (FIG. 2), the second cavity portion G" making it possible to cool the transverse wall 26 at the trailing edge 2. In other words, the cavity G extends from the blade root 14 to the trailing edge 20.

In addition, the first cavity portion G' presents a large aspect ratio such that, in cross-section (FIGS. 4C and 4D for example), one dimension (length) is at least three times greater than another dimension (width), giving it a "slender", or elongate shape. That makes it possible to maximize the surface area for exchange between the air flowing in the cavity G and the suction side face 24. Apart from the trailing edge cavity H, the shape of which is determined by the shape of the blade 10 at the trailing edge 20, the suction side cavity G of the third cooling circuit 3 is the only cavity, from among all of the cavities within the blade 10, to present such an aspect ratio. By limiting the number of cavities that present such an aspect ratio, it is possible to facilitate the process of manufacturing the blade.

The trailing edge cavity H does not extend radially over the entire length of the blade 10, and is limited in length by the second cavity portion G". In addition, the cavities of the third cooling circuit 3 communicate with trailing edge orifices 56 opening out on the pressure side face 22 at the trailing edge 20, the trailing edge orifices 56 being distributed radially along the blade 10. These orifices 56 make it possible to discharge the cold air flowing in both of these cavities.

Although the present invention is described with reference to specific embodiments, it is clear that various modifications and changes may be undertaken on those embodiments without going beyond the general ambit of the invention as defined by the claims. In particular, the number of cooling circuits and the number of cavities making up each of the circuits is not limited to the numbers presented in this example. Consequently, the description and the drawings should be considered in a sense that is illustrative rather than restrictive.

It is also clear that all of the characteristics described with reference to a method can be transposed, alone or in combination, to a device, and conversely, all of the characteristics described with reference to a device can be transposed, alone or in combination, to a method.

The invention claimed is:

1. An aviation turbine blade extending in the radial direction and presenting a pressure side and a suction side, including a plurality of pressure side cavities extending radially at the pressure side of the blade, a plurality of suction side cavities extending radially at the suction side of the blade, and at least one central cavity located in a central portion of the blade and surrounded by the plurality of pressure side cavities and by the plurality of suction side cavities, the blade including a plurality of cooling circuits independent from one another, in which at least a first cooling circuit comprises:
   a first cavity and a second cavity, the first and second cavities communicating with each other at a radially inner end and at a radially outer end of the blade;
   a third cavity communicating with the second cavity at the radially outer end; and
   a fourth cavity communicating with the third cavity at the radially inner end;
   the first and second cavities being configured to be fed jointly with cold air through a common air intake opening at the radially inner end, and so that the air flows radially therein in a same direction;
   the first cavity being a pressure side cavity of the plurality of pressure side cavities, the second cavity being the at least one central cavity, and the third and fourth cavities being suction side cavities of the plurality of suction side cavities.

2. The blade according to claim 1, including a plurality of pressure side orifices, each communicating with the first cavity and opening out in the pressure side of the blade.

3. The blade according to claim 1, including a plurality of suction side orifices, each communicating with the fourth cavity and opening out onto the suction side of the blade.

4. The blade according to claim 1, including at least a second cooling circuit including two pressure side cavities of the plurality of pressure side cavities, communicating with each other via a plurality of passages distributed in the radial direction along the blade between the two pressure side cavities, one of the two pressure side cavities being fed with cold air via an air intake opening at the radially inner end of the blade.

5. The blade according to claim 4, including at least a third cooling circuit including a suction side cavity of the plurality of suction side cavities and a trailing edge cavity extending radially both on the suction side and on the pressure side of the blade near the trailing edge, both the suction side cavity and the trailing edge cavity being fed with cold air via an air intake opening at the radially inner end of the blade, the suction side cavity forming an angle at the radially outer end of the blade, in such a manner as to extend until it reaches the trailing edge of the blade.

6. The blade according to claim 1, including two thin cavities or less, wherein, in a section perpendicular to the radial direction, a thin cavity has a first length that is greater than or equal to at least seven times a second length.

7. A gas turbine including blades according to claim 1.

* * * * *